United States Patent
Park et al.

(10) Patent No.: US 8,015,016 B2
(45) Date of Patent: Sep. 6, 2011

(54) AUTOMATIC TRANSLATION METHOD AND SYSTEM BASED ON CORRESPONDING SENTENCE PATTERN

(75) Inventors: Jun Park, Daejeon (KR); Seung Hi Kim, Daejeon (KR); Hyung Bae Jeon, Daejeon (KR); Young Jik Lee, Daejeon (KR); Hoon Chung, Gangwon-do (KR)

(73) Assignee: Electronics and Telecommunications Research Institute, Daejon (KR)

( * ) Notice: Subject to any disclaimer, the term of this patent is extended or adjusted under 35 U.S.C. 154(b) by 962 days.

(21) Appl. No.: 11/924,102

(22) Filed: Oct. 25, 2007

(65) Prior Publication Data
US 2008/0109228 A1 May 8, 2008

(30) Foreign Application Priority Data
Nov. 6, 2006 (KR) .................. 10-2006-0108979

(51) Int. Cl.
G10L 21/00 (2006.01)
G06F 17/27 (2006.01)
G06F 17/28 (2006.01)
(52) U.S. Cl. .................. 704/277; 704/4; 704/9
(58) Field of Classification Search .......... 704/2–3, 704/8, 277
See application file for complete search history.

(56) References Cited

U.S. PATENT DOCUMENTS

| | | | | |
|---|---|---|---|---|
| 4,980,829 A * | 12/1990 | Okajima et al. | .................. | 704/5 |
| 4,984,177 A * | 1/1991 | Rondel et al. | .................. | 704/277 |
| 6,356,865 B1 * | 3/2002 | Franz et al. | .................. | 704/2 |
| 6,859,778 B1 * | 2/2005 | Bakis et al. | .................. | 704/277 |
| 6,917,920 B1 * | 7/2005 | Koizumi et al. | .................. | 704/277 |
| 7,117,223 B2 * | 10/2006 | Koizumi et al. | .................. | 1/1 |
| 7,158,934 B2 * | 1/2007 | Honda et al. | .................. | 704/244 |
| 2002/0198713 A1 * | 12/2002 | Franz et al. | .................. | 704/252 |
| 2003/0040899 A1 * | 2/2003 | Ogilvie | .................. | 704/2 |
| 2006/0129393 A1 * | 6/2006 | Oh et al. | .................. | 704/234 |

FOREIGN PATENT DOCUMENTS

JP 05-061905 3/1993
(Continued)

OTHER PUBLICATIONS

Ikeda et al, "Automatic interpretation system integrating free-style sentence translation and parallel text based translation", Proceedings of the ACL-02 workshop on Speech-to-speech translation: algorithms and systems, p. 85-92, Jul. 11, 2002.*

(Continued)

*Primary Examiner* — Richemond Dorvil
*Assistant Examiner* — Olujimi Adesanya
(74) *Attorney, Agent, or Firm* — Lowe Hauptman Ham & Berner LLP (57) ABSTRACT

Provided are an automatic speech translation system and a method for obtaining accurate translation performance with a simple structure. Because input and output sentences are written in different languages, automatic speech translation requires techniques for processing different languages. Repetition of text processing like morpheme analysis or sentence parsing in conventional automatic speech translation can complicate the overall translation process. Meanwhile, although input and output sentences are written in different languages, they have to have the same meaning and a corresponding sentence form and words. Accordingly, the corresponding words and sentence forms of the two languages can be expressed with a simple structure and utilized in the automatic speech translation process, thereby maintaining consistency during the process and avoiding unnecessary process repetition, which reduces errors and improves performance.

9 Claims, 5 Drawing Sheets

FOREIGN PATENT DOCUMENTS

| | | |
|---|---|---|
| JP | 06-118981 | 4/1994 |
| KR | 10-1994-0009402 | 4/1994 |
| KR | 10-0202539 | 3/1999 |
| KR | 1020010021104 | 3/2001 |
| KR | 1020010057775 | 7/2001 |
| KR | 1020020076044 | 10/2002 |
| KR | 10-2005-0046121 | 5/2005 |

OTHER PUBLICATIONS

Office Action for Korean App. 10-2006-0108979.
Korean Office Action for Korean application No. 10-2006-0108979.
L. Mayfield et al.; "Concept-based Speech Translation"; 0-7803-2431-5/95 $4.00 © 1995 IEEE; pp. 97-100.

\* cited by examiner

| | | |
|---|---|---|
| <name of place 1>에서(from) | 1 | 0 |
| <name of place 2>까지(to) | 2 | 0 |
| <transportation>(으)로(by) | 3 | 0 |
| "얼마나 걸립니까?"<br>("How long does it take?") | | | name of place 1: 인천(Incheon)
name of place 2: 뉴욕(New York)
transportation: 비행기(plane)

FIG. 3B

| | | |
|---|---|---|
| <name of place 1>에서(from) | 1 | X |
| <name of place 2>까지(to) | 2 | 0 |
| <transportation>(으)로(by) | 3 | 0 |
| "얼마나 걸립니까?"<br>("How long does it take?") | | | name of place 2: 뉴욕(New York)
transportation: 비행기(plane)

AUTOMATIC TRANSLATION METHOD AND SYSTEM BASED ON CORRESPONDING SENTENCE PATTERN

CROSS-REFERENCE TO RELATED APPLICATION

This application claims priority to and the benefit of Korean Patent Application No. 2006-0108979, filed Nov. 6, 2006, the disclosure of which is incorporated herein by reference in its entirety.

BACKGROUND

1. Field of the Invention

The present invention relates to an automatic speech translation system, and more particularly, to an automatic speech translation method and system based on a corresponding sentence template.

2. Discussion of Related Art

Generally, three steps are needed for automatic speech translation: a speech recognition step of converting speech in one language into a written sentence, a language translation step of translating the sentence into another language, and a speech synthesis step of producing and outputting speech corresponding to the translated sentence. Here, each step commonly uses text sentences as input/output.

However, these three steps in the automatic speech translation process have been developed to be performed independently. This causes that the same kinds of processes are repeated in each step. Consequently, not only the efficiency of overall translation process is poor, but also the quality of overall automatic speech translation tends to be poorer due to the error accumulation of repeated processes.

That is, even though morpheme analysis data is used in the speech recognition step, the speech recognition result is output simply as text which is morpheme-analyzed or parsed again in the language translation step. Also, the sentence output from the language translation step is transferred to the speech synthesis step in text form where it is morpheme-analyzed yet again in order to extract syntax data, prosody data, and so on.

During these steps, processing errors may be accumulated, thereby degrading automatic speech translation performance.

SUMMARY OF THE INVENTION

The present invention is directed to an automatic speech translation method and system based on a corresponding sentence template in which each step generates output as a sentence template rather than as text and transfer the output to a next step, thereby avoiding functionally unnecessary and repetitive processes and maintaining and utilizing data obtained from a previous process.

One aspect of the present invention provides an automatic speech translation system based on a corresponding sentence template, the system including: a speech recognizer searching a sentence template network in response to an input speech signal and outputting the best matching sentence template along with the corresponding words for the classes included in the sentence template; a language translator receiving the sentence template and the words which are generated by the speech recognizer, and outputting a translated sentence template and translated words using a corresponding sentence template dictionary and a corresponding word dictionary, respectively; and a speech synthesizer searching for prosody data corresponding to the translated sentence template in a sentence template prosody data dictionary and synthesizing speech based on the search result.

Another aspect of the present invention provides an automatic translation method based on a corresponding sentence template, the method including the steps of: (a) extracting speech features used for speech recognition from an input speech signal, and outputting an sentence template most closely corresponding to the input speech signal; (b) searching for an output sentence template corresponding to the input sentence template and translated words, with respect to words included in the input sentence template; (c) extracting prosody data with respect to the output sentence template; and (d) synthesizing a speech signal based on the prosody data.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The foregoing and other objects, features and advantages of the invention will be apparent from the following more particular description of exemplary embodiments of the invention, as illustrated in the accompanying drawings. While, the present invention may be applied to automatic speech translation between any languages, automatic speech translation from Korean to English will be described herein for convenience.

Figure 1:
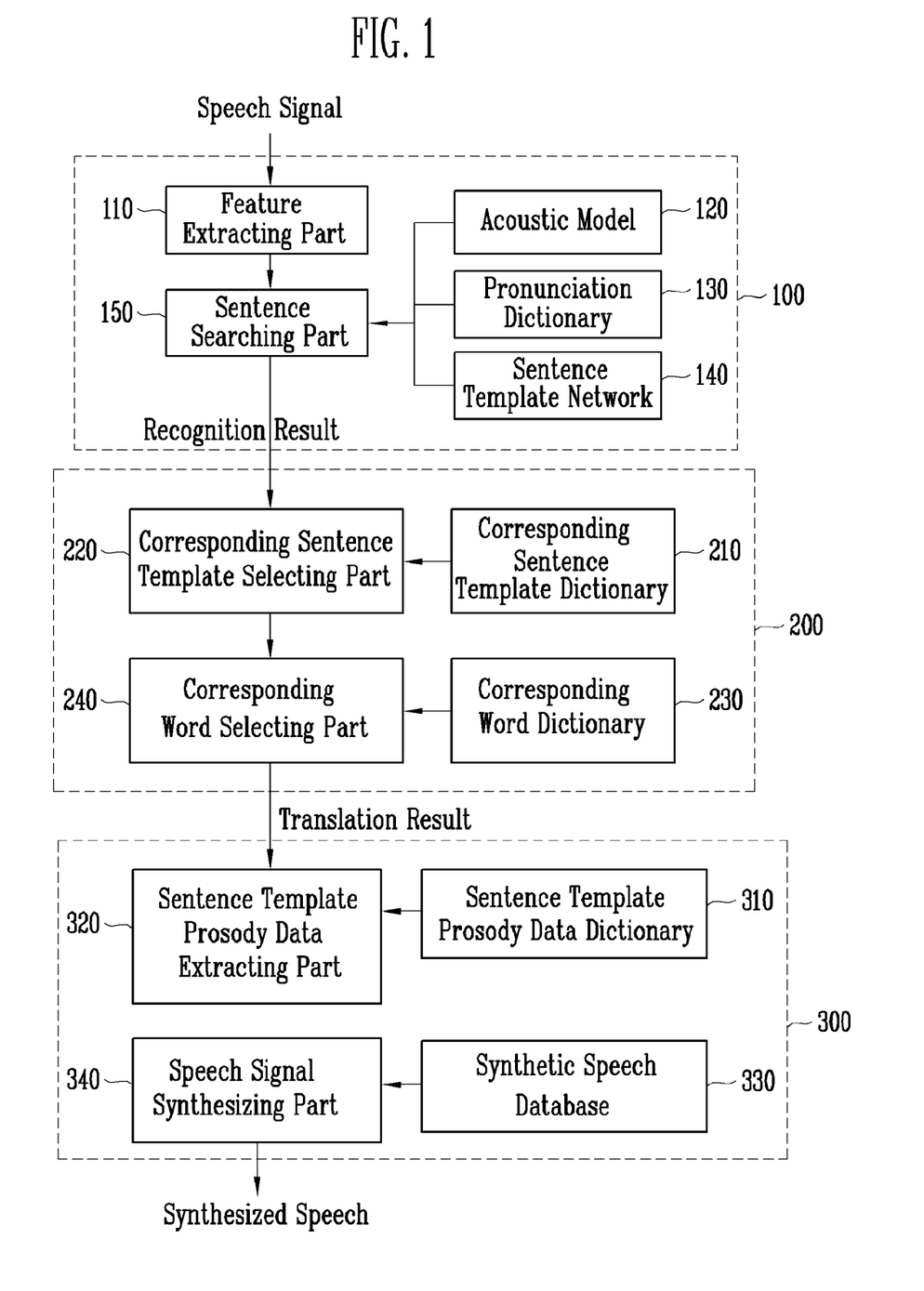
FIG. 1 is a block diagram of an automatic speech translation system based on a corresponding sentence template according to the present invention.

FIG. 1 is a block diagram of an automatic speech translation system based on a corresponding sentence template according to the present invention.

As illustrated in FIG. 1, the system includes a speech recognizer 100, a speech translator 200 and a speech synthesizer 300.

First, the speech recognizer 100 includes a feature extracting part 110 extracting speech features used for speech recognition from an input speech signal, an acoustic model 120 containing the acoustic model of phonemes, and a pronunciation dictionary 130 representing the pronunciation of each word by a series of phonemes, a sentence template network 140 representing the whole sentence template space which corresponds to all the candidate sentences to be recognized, and a sentence searching part 150 determining a sentence most closely matching the speech signal by searching the sentence template network 140 using the acoustic model 120 and the pronunciation dictionary 130 on the basis of the speech features extracted from the feature extracting part 110 and outputting the sentence template and its word components most closely corresponding to the input sound signal as the recognition result.

The sentence template network 140 is a group of sentence templates in which each sentence to be recognized is marked as a network of words. A sentence template is designed to be divided into a set of sentence elements so that each sentence element can have its corresponding counterpart between two given languages. The sentence element can be shared among sentence templates in order for the sentence template network to be more compact.

Also, a sentence element may contain one or more word classes which represent a set of words having the same characteristic. Using the word class, the sentence element becomes more expressive, that is, can accommodate more sentence instances.

Figure 2A:
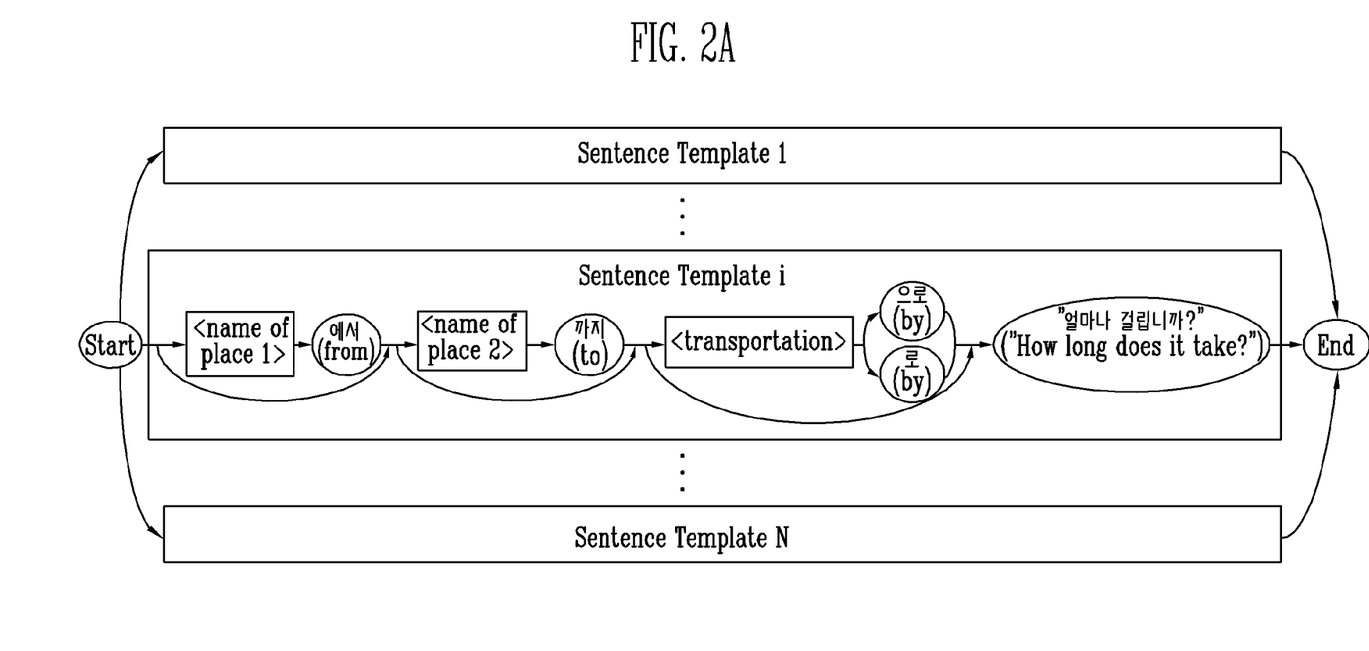
FIGS. 2A to 2C illustrate a sentence template network of a speech recognizer according to the present invention.
Figure 2B:
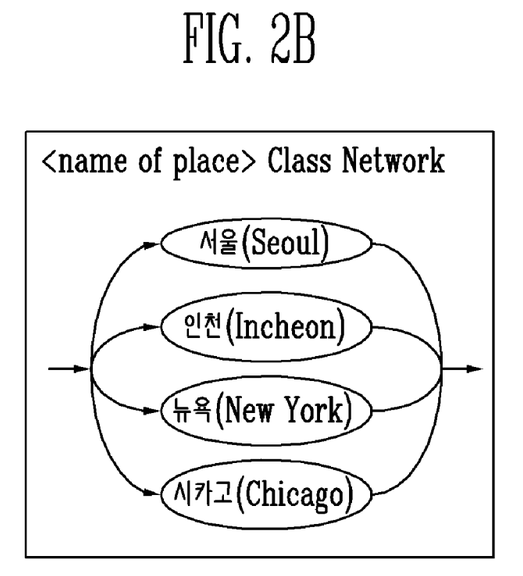
Figure 2C:
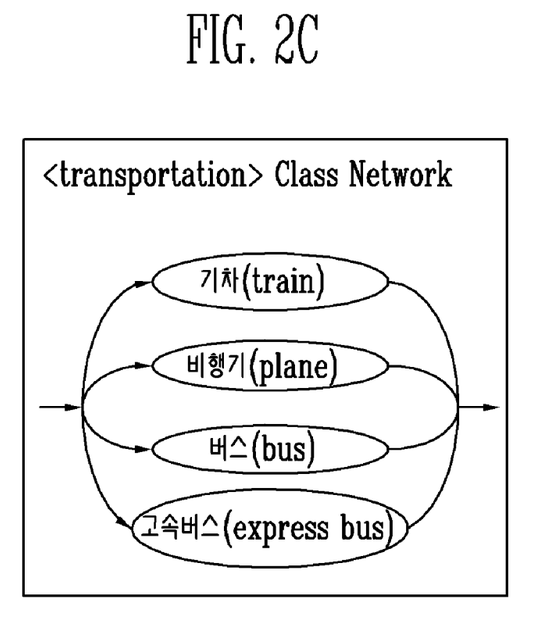

FIGS. 2A to 2C illustrate a sentence template network of a speech recognizer according to the present invention, and FIG. 2A illustrates a sentence template network in which each sentence template is represented as a path from "Start" node to 'End' node. For example, the sentence template for the sentence, "인천에서 뉴욕까지 비행기로 얼마나 걸립니까? (How long does it take from Incheon to New York by plane?)", is illustrated in FIG. 2A. For readability, English expressions are followed with parentheses for Korean expressions from now on.

Referring to FIG. 2A, the illustrated sentence template is composed of four sentence elements: '<name of place>에서 (from)', '<name of place>까지(to)', '<transportation>(으)로(by)', and '얼마나걸립니까? (How long does it take?)'. The first three sentence elements are shown to include the classes, '<name of place>' and '<transportation>', in addition to words or phrases.

FIGS. 2B and 2C illustrate a class network of the classes, '<name of place>' and '<transportation>', respectively. The class network of '<name of place>' is shown to include '서울(Seoul)', '인천(Incheon)', '뉴욕(New York)', and '시카고(Chicago)'.

Figure 3A:
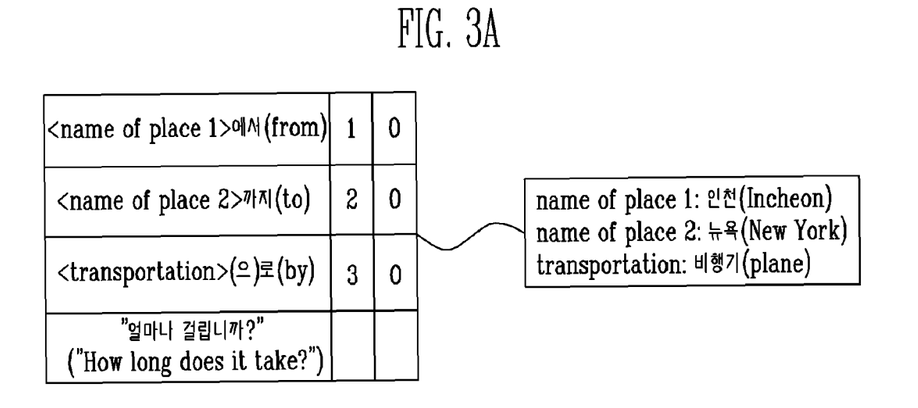
FIGS. 3A and 3B illustrate sentence templates output from the speech recognizer and attached word lists according to the present invention.

Accordingly, as listed in the table of FIG. 3A, the speech recognizer 100 outputs the recognition result as a sentence template formed of at least one sentence element, and words corresponding to the class included in the sentence template.

Figure 3B:
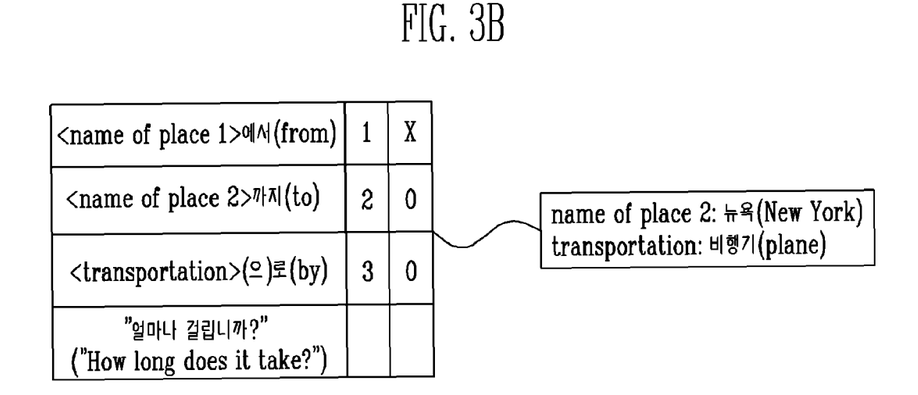

In particular, referring to FIG. 3B, in order to mark a part omitted from a basic sentence template, sentence elements capable of being omitted are serially numbered in advance and output with tags showing whether they are contained in the recognition result of the speech recognizer 100 to be translated. For example, in response to the input "뉴욕까지비행기로 얼마나 걸립니까? (How long does it take to New York by plane?)", the element 'from <name of place 1>' is omitted, and a tag 'X' is attached to show that the sentence element is not included.

As such, the speech recognizer 100 according to the present invention outputs a specific sentence template and class-matching words included therein in response to the input speech signal.

The language translator 200 includes a corresponding sentence template dictionary 210 consisting of corresponding sentence template pairs of different languages, a corresponding sentence template selecting part 220 searching for an output sentence template corresponding to an input sentence template using the corresponding sentence template dictionary 210, a corresponding word dictionary 230 including corresponding word pairs of different languages, and a corresponding word selecting part 240 searching for corresponding words with respect to the words included in the input sentence template using the corresponding word dictionary 230.

Thus, the language translator omits complicated steps performed in a conventional language transition system (for example, morpheme analysis, phrase analysis and sentence parsing) and obtains a corresponding sentence template by means of a simple dictionary search, which reduces processing time while achieving more accurate translation performance.

Here, in building the corresponding sentence template dictionary 210, the inclusion range of the input sentence may be expanded by adding sentence template pairs of the two languages.

Such a language translator 200 searches the corresponding sentence template dictionary 210 for a target language sentence template corresponding to the given sentence template from the speech recognizer 100, and extracts translated words corresponding to the class included in the sentence template from the corresponding word dictionary 230, thereby outputting the translation result.

Figure 4:
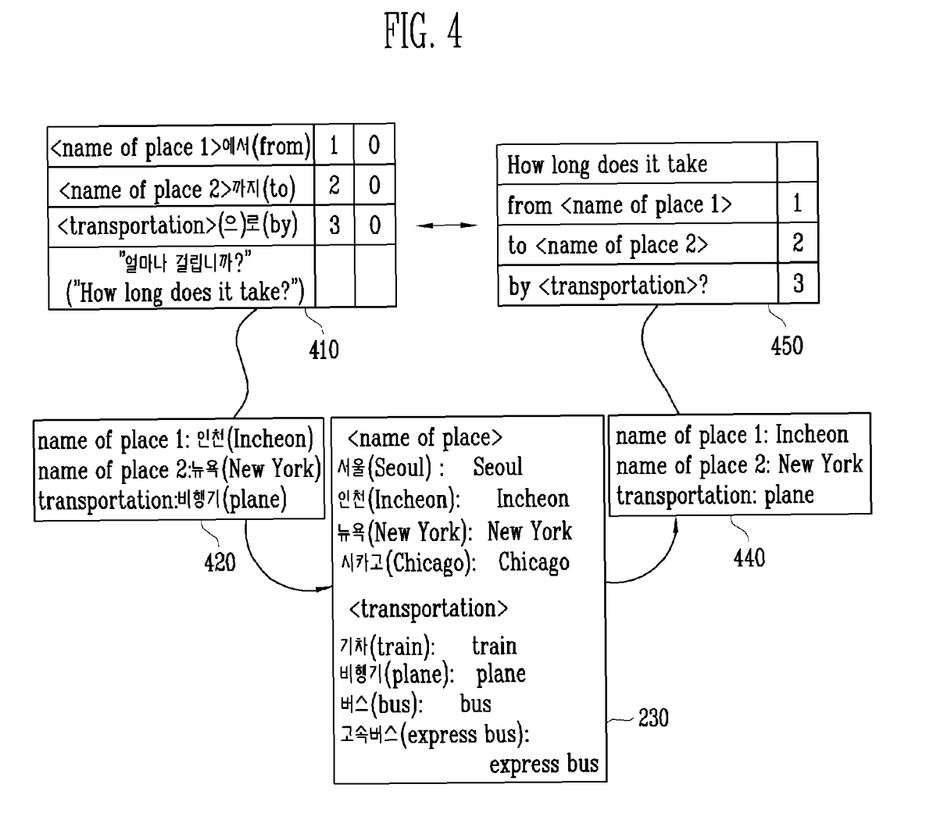
FIG. 4 illustrates a language translation process according to the present invention.

For example, in response to the input speech signal "인천에서뉴욕까지 비행기로 얼마나 걸립니까? (How long does it take from Incheon to New York by plane?)", a sentence template such as Table 410 and class matching words such as Table 420 in FIG. 4 are input to the language translator.

Then, the corresponding sentence template selecting part 220 chooses Table 450 of an English sentence template corresponding to Table 410 of a Korean sentence template using the corresponding sentence template dictionary 210. And the corresponding word selecting part 240 chooses for the translated words 'Incheon', 'New York' and 'plane' corresponding to the words '인천(Incheon), '뉴욕'(New York) and '비행기'(plane) included in respective sentence elements using the corresponding word dictionary 230, as listed in Table 440. Subsequently, Table 450 of a sentence template and a set of words 440 corresponding to a class included therein is output as a translation result.

The language translator 200 according to the present invention has a simple structure and clearly processes a corresponding sentence template and a translated word. This improves translation accuracy. Accordingly, to translate various sentences, the corresponding sentence template dictionary 210 has to be built in advance to include corresponding sentence template pairs for expected input sentences.

Meanwhile, the speech synthesizer 300 includes a sentence template prosody data dictionary 310 including prosody data corresponding to the sentence template, a sentence template prosody data extracting part 320 extracting prosody data with respect to a translated sentence template input to the speech synthesizer 300, a synthetic speech database 330 which contains a set of speech segments or feature parameters for synthesis units, and a speech signal synthesizing part 340 which generates the synthesized speech signal based on the speech data stored in the synthetic speech database 330.

The speech synthesizer 300 needs various prosody data, such as spacing between words of a sentence and stress applied to each word, in order to generate natural synthetic speech. This data is dependant on the sentence template. Thus, the sentence template prosody data dictionary 310 containing appropriate prosody data for each sentence template is built in advance, and the prosody data corresponding to the sentence template transferred from the language translator 200 is extracted from this dictionary 310, and then, a speech signal is generated by a speech signal synthesizing part 340 using this prosody data, based on a synthetic sound piece connection method or a method of generating a speech signal from parameters, and finally a synthesized speech is output.

Figure 5:
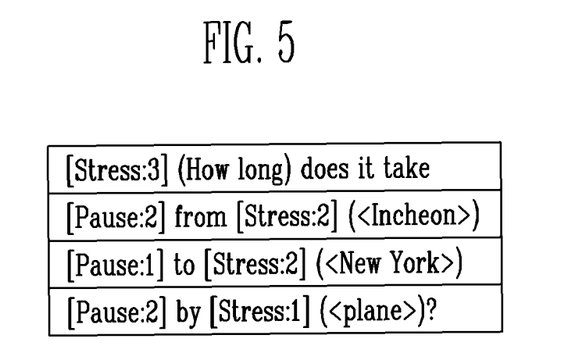
FIG. 5 illustrates a sentence template prosody data expression used in a speech synthesizer according to the present invention.

An example of expressing sentence template prosody data as stress and length of pause between words is illustrated in FIG. 5 with respect to the sentence described above. This example may be designed according to specific application or may follow any standard like a Speech Synthesis Markup Language (SSML) standard provided in the World Wide Web Consortium (W3C).

Consequently, since the speech synthesizer 300 may easily obtain appropriate prosody data for an input sentence template by searching the sentence template prosody data dictionary 310, avoiding the load of the conventional method of extracting prosody data by analyzing a sentence again.

As described above, a method of processing a sentence template instead of text in each step of automatic speech translation according to the present invention results in a simple structure, simple operation and high-quality automatic speech translation performance. In particular, the inventive method avoids needless repetition of the same processes and the performance degradation such repetition can cause.

Moreover, according to the present invention, necessary data such as corresponding sentence templates and prosody data is built in advance by off-line processes, which can greatly reduce workload in real-time operation.

As a result, an automatic speech translation system according to the present invention can realize high-quality automatic speech translation with structural and operational simplicity, and may be applied to various automatic speech translation products and services.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An automatic speech translation system, the system comprising:
   a speech recognizer configured to extract speech features from an input speech signal in a first language and to form an input language table, the input language table including an input sentence template selected by the speech recognizer from a set of sentence templates, a word class of the input sentence template, and tags showing whether each sentence element of the input sentence template is identified in the extracted speech features, the input sentence template being one of the set of sentence templates that is most closely corresponding to the input speech signal and composed of sentence elements having corresponding sentence elements in a second language;
   a language translator configured to receive the input language table from the speech recognizer, and to generate a translated language table corresponding to the input language table, wherein the translated language table includes a translated sentence template corresponding to the input sentence template and a translated word corresponding to a word in the word class, and the translated sentence template is composed of the corresponding sentence elements in the second language and;
   a speech synthesizer configured to synthesize an output speech signal based on prosody data corresponding to the translated sentence template.

2. The system according to claim 1, wherein the speech recognizer comprises:
   a feature extracting part arranged for extracting speech features used for speech recognition from the input speech signal; and
   a sentence searching part arranged for selecting searching the input sentence template based on the extracted speech features by searching a sentence template network and the word class by searching a set of word classes, the sentence template network composed of the set of sentence templates in which each one of the set of sentence templates is formed as a network of sentence elements.

3. The system according to claim 1, wherein the language translator comprises:
   a corresponding sentence template selecting part arranged for selecting the translated sentence template corresponding to the input sentence template from a corresponding sentence template dictionary, the corresponding sentence template dictionary including corresponding sentence template pairs of different languages; and
   a corresponding word selecting part arranged for translating at least one word in the word class according to a corresponding word dictionary, the translated word dictionary including corresponding word pairs of different languages.

4. The system according to claim 3, wherein the corresponding sentence template selecting part outputs the translated sentence template composed of corresponding elements with by marking of whether respective sentence elements in the input sentence template are identified in the input speech signal.

5. The system according to claim 1, wherein the speech synthesizer comprises:
   a sentence template prosody data extracting part arranged for extracting the prosody data with respect to the translated sentence template from a sentence template prosody data dictionary, the sentence template prosody data dictionary including the prosody data corresponding to the translated sentence template; and
   a speech signal synthesizing part arranged for synthesizing the output speech signal based on the prosody data and a synthetic speech database.

6. An automatic speech translation method, comprising:
   extracting speech features used for speech recognition from an input speech signal in an input language;
   selecting, by a speech recognizer, an input sentence template that is most closely corresponding to the input speech signal in a set of sentence templates and a word class of the input sentence template from a set of word classes, the input sentence template being composed of the sentence elements having corresponding sentence elements in a second language;
   forming an input language table including the input sentence template, the word class, and tags showing whether each of the sentence elements of the input sentence template is identified in the extracted speech features;
   generating a translated language table corresponding to the input language table, wherein the translated language table includes a translated sentence template corresponding to the input sentence template and a translated word corresponding to a word in the word class, and the translated sentence template is composed of the corresponding sentence elements in the second language selecting prosody data corresponding to the translated sentence template; and synthesizing a speech signal based on the prosody data.

7. The method according to claim 6, wherein the prosody data includes spacing between words in the translated sentence template or stress applied to each word in the translated sentence template.

8. The method according to claim 6, wherein the generation of the translated language table is performed according to a corresponding sentence template dictionary including corresponding sentence template pairs of different languages.

9. The system according to claim 1, wherein the prosody data includes spacing between words in the translated sentence template or stress applied to each word in the translated sentence template.

* * * * *